United States Patent [19]

Savage

[11] 4,374,863

[45] Feb. 22, 1983

[54] COMPOSITIONS AND METHODS FOR PROVIDING NONADHERENT DOUGH FOR BAKED GOODS

[75] Inventor: Frances H. Savage, Lawrenceburg, Ind.

[73] Assignee: The Procter & Gamble Co., Cincinnati, Ohio

[21] Appl. No.: 239,766

[22] Filed: Mar. 2, 1981

[51] Int. Cl.³ .............................................. A21D 13/00
[52] U.S. Cl. ..................................... 426/553; 426/611
[58] Field of Search ............................... 426/552–554, 426/602, 603, 611–612, 653, 654

[56] References Cited

U.S. PATENT DOCUMENTS

| | | | |
|---|---|---|---|
| 1,971,886 | 8/1934 | Votaw et al. | 426/553 |
| 2,132,396 | 10/1938 | Coith et al. | 426/553 |
| 2,532,523 | 12/1950 | Trempel | 426/553 |
| 2,864,703 | 12/1958 | Schulman | 426/553 |
| 3,145,107 | 8/1964 | Howard | 426/611 |
| 3,415,659 | 12/1968 | Purves | 426/610 |
| 3,508,926 | 4/1970 | Werbin et al. | 426/297 |
| 3,549,387 | 12/1970 | Howard | 426/263 |
| 3,553,802 | 10/1970 | Cooper et al. | 426/553 |
| 3,759,717 | 9/1973 | Buddemeyer et al. | 426/549 |

FOREIGN PATENT DOCUMENTS 50-89886  3/1975  Japan.
846777  8/1960  United Kingdom ............... 426/602

OTHER PUBLICATIONS

Y. Nakanishi and S. Shiomi, *Rev. Int. Choc.*, 26, 50 (1971).
Tsen, et al., *Cereal Chem.*, 52 (5), 629–637 (1975).
Tsen, et al., *The Bakers Digest*, Aug. 1973, pp. 34–39.
C A 86:42052z.
Daoust, et al., *Cereal Chem.*, 55 (2), 255–258 (1978).
Hutchinson, et al., *J. Food Science*, 42 (2), 399–401 (1977).

*Primary Examiner*—Raymond N. Jones
*Assistant Examiner*—Elizabeth A. Hatcher
*Attorney, Agent, or Firm*—Michael J. Roth; Steven J. Goldstein; Richard C. Witte

[57] ABSTRACT

High emulsifier levels and freely available water in baked-good doughs provide dough systems with an apparent lipid-continuous, rather than sugar syrup-continuous liquid phase. When this lipid-continuous system is present, the contact surfaces of the dough mass exhibit the non-sticky character of a shortening, rather than the inherently sticky character of a sugar syrup. The dough can then be easily rolled, extruded, scooped, etc., with minimal adherence to mixing and forming equipment surfaces.

42 Claims, No Drawings

COMPOSITIONS AND METHODS FOR PROVIDING NONADHERENT DOUGH FOR BAKED GOODS

TECHNICAL FIELD

High sugar, low moisture baked-good doughs, such as cookie doughs, are typically quite sticky due to the dominant phase of concentrated sugar syrup. Such doughs are difficult to handle, either manually or in automated systems, because they adhere to virtually all types of surfaces.

A means has now been developed to greatly reduce or eliminate the characteristic stickiness of these doughs without significantly changing the nature of the resulting baked product. The procedure involves only specific, relatively minor changes in formulation.

In particular, it has now been discovered that the use of selected emulsifiers at levels higher than normally used in dough formulation, in combination with freely available water in the dough, results in dough systems with an apparent lipid-continuous, rather than sugar-syrup-continuous liquid phase. When this lipid-continuous system is present, the contact surfaces of the dough mass exhibit the non-sticky character of a shortening, rather than the inherently sticky character of a sugar syrup. This non-sticky character persists, regardless how the dough is handled.

While not intending to be limited by theory, it is believed that the desirable and novel effect of this invention traces to the formation of a stable hydrated mesomorphic phase (mesophase) consisting of emulsifier and freely available water. This mixed phase then coats much or all of the dry ingredients in the dough, preventing absorption of the shortening. As a result, the shortening is free within the dough system and forms the continuous phase.

BACKGROUND ART

A Japanese patent application laid open for examination, No. 89,886 (1975) discloses the use of a sucrose fatty acid ester at levels of up to 0.3% to emulsify fat and oil in sugar syrup. Candies made thereby do not stick to teeth.

U.S. Pat. No. 2,586,615, Cross (Pennsylvania Manufacturing Confectioners' Association, 1952), teaches the blending of emulsifier directly into chocolate to achieve "bloom" control. U.S. Pat. No. 2,626,216, Cross (Atlas Powder Company, 1953) is similar.

M. Wootton, et al., Chem. Ind., 32, 1052-3 (1970) describes the mechanism of fat migration in chocolate enrobed goods. The article indicates that migration of fat from a biscuit base into enrobing chocolate is related to the liquid fat content of the biscuit.

British Pat. No. 855,310, Radley (Ilford, Ltd., 1960) relates to the use of emulsifiers (partial fatty acid esters of sucrose) to reduce the viscosity of chocolate.

U.S. Pat. No. 3,533,802, Cooper et al. (CPC International, 1970) describes a stable oil in water emulsion containing shortening, an aqueous sugar solution, and up to 2.5% water-soluble or water-dispersible emulsifiers. The emulsions are taught for use in producing baked goods, including cookies.

DISCLOSURE OF THE INVENTION

This invention provides a nonadherent dough composition for baked goods, comprising: (a) sugar; (b) flour; (c) shortening; (d) 15-60%, by weight of the shortening, of water; and (e) sufficient emulsifier active at dough mixing temperatures to render the dough shortening-continuous.

The present invention also provides a method for rendering nonadherent a baked-good dough comprising sugar, flour, shortening and water in typical baked good formulation proportions, comprising adding to the dough sufficient emulsifier to render the dough shortening-continuous at the dough mixing temperature.

By "baked goods" herein is meant any bakery product having the low water levels necessary to form a water-in-oil emulsion under the conditions of bakery mixing. Water levels of from about 15% to about 60% by weight, shortening basis, are suitable. Within this range of water levels can be formulated cookies, crackers, biscuits, and the like. Cookies are an especially preferred product when prepared by this invention.

All percentages herein are by weight, unless otherwise indicated.

Shortening

The fats which can be used as the shortening component in this invention can be any of the usual fat stocks employed in preparing liquid, plastic, or solid shortenings. Various fats such as cottonseed oil, soybean oil, lard, palm oil, and other vegetable and animal fats or mixtures thereof, either unhydrogenated or in various stages of hydrogenation, can be used.

Preferably, the shortening comprises a fatty glyceride derived from animal, vegetable or marine fats and oils, or a similar fatty glyceride synthetically produced. These glycerides can contain saturated or unsaturated "long-chain" acyl radicals having from about 12 to about 22 carbon atoms, such as lauroyl, lauroleoyl, myristoyl, myristoleoyl, palmitoyl, palmitoleoyl, stearoyl, oleoyl, lineoleoyl, linolenoyl, arachidoyl, arachidonoyl, behenoyl, erucoyl, and the like, and are generally obtained from edible triglyceride fats and oils such as cottonseed, soybean, coconut, rapeseed, peanut, olive, palm, palm kernel, corn, sunflower, safflower, sesame seed, rice bran, wallflower, nasturtium seed, mustard seed, whale, sardine, herring, menhaden, and pilchard oils as well as from lard, tallow and the like. Also suitable as part of the glycerides of the shortening are certain di- or triglycerides in which one or two of the hydroxyl groups of the glycerine have been esterified with "short-chain" fatty acids having from 2 to about 6 carbon atoms such as acetic, propionic, butyric, valeric, and caproic acids, and one or two of the remaining hydroxyl groups have been esterified with higher molecular weight fatty acids having from about 12 to about 22 carbon atoms. These glycerides, containing both high and low molecular weight acid radicals, are referred to as low molecular synthetic fats.

Of course, mixtures of the above oils or other oils can also be used as the shortening component of this invention.

Emulsifiers

By the term "emulsifier" herein is meant either a single emulsifier or an emulsifier system comprising a mixture of emulsifiers. A wide variety of surface active emulsifiers can be used in the practice of this invention. In selecting suitable emulsifiers, materials should be selected which are of food-acceptable composition and quality; however, the key criterion for selection is that the emulsifier render the dough system oil-continuous, rather than sugar-syrup continuous. While not intending to be limited by theory, many materials which function suitably are those which are relatively lipophilic, yet interact with water to form a stable hydrated mesomorphic phase. Such mesophases behave as liquids or gels in their mechanical properties and as crystalline solids in their optical properties.

Partially esterified polyhydric compounds having surface active properties are exceptionally suitable as emulsifiers. This class of emulsifiers includes, among others, mono- and diglycerides of fatty acids which are active at dough mixing temperatures, such as monopalmitin, monolaurin and monoolein; sucrose partial fatty acid esters, such as sucrose monooleate; and partial fatty acid esters of sorbitol or its anhydrides, such as sorbitan monooleate.

Other particularly suitable emulsifiers for use in the practice of this invention are the polyglycerol esters (PGEs). Examples of PGEs are decaglycerol decaoleate, triglycerol monostearate, octaglycerol monostearate, and octaglycerol monooleate. These materials are normally not obtained in pure form, but are generally the reaction products of an esterification between a preselected cut of polyglycerols and desired saturated or unsaturated fatty acids. The result is a statistical distribution of polyglycerol mono- and poly-esters determined by reactants and reaction conditions. Polyglycerol esters suitable for use in the present invention have an average of from 2 to 10 glycerol units and from 1 to 3 saturated or unsaturated fatty acyl groups of from 14 to 18 carbon atoms per polyglycerol moiety. Preferred polyglycerol esters have an average of 2 or 3 glycerol units and 1 fatty acyl group having from 14 to 18 carbon atoms per polyglycerol moiety.

Other suitable emulsifiers include commercial soybean lecithin, which is a naturally occurring mixture of similar compounds identified as phosphatides or phospholipids, namely, lecithin (phosphatidyl choline), cephalin (phosphatidyl ethanolamine), and related phosphorus-containing lipids.

Fractionated lecithins, which are soluble in oil and dispersible in water, are also suitable emulsifiers herein. They are commercial lecithin products in which the ratio of phosphatides has been manipulated to accentuate their emulsifying and surface active properties. These products are available commercially from a number of suppliers.

Within the foregoing described classes of compounds, those emulsifiers having hydrophilic-lipophilic balance (HLB) values of at most about 8 are particularly effective and thus preferred in the practice of this invention. HLB values are available from suppliers of emulsifiers, from standard reference texts, or can be determined by standard techniques.

The emulsifiers used in the practice of this invention will be used in quantities which are sufficient to form a water-in-oil emulsion in the dough system. In this context, the term "emulsion" is used loosely to describe a system in which oil or shortening is the continuous phase and water is the disperse phase; the water droplets are rather too large and irregular in shape for the system to be considered a true emulsion. Nonetheless, the differences between a shortening-continuous dough and a sugar-syrup-continuous dough will be immediately evident to those of skill in the food arts. The shortening-continuous character can also be readily determined using standard light microscopy techniques to observe behavior of the shortening and water phases, suspended particulates, and dissolved solutes.

Percentages of emulsifier, by weight of shortening, can vary substantially, depending upon the emulsifying capability of the particular materials selected. For relatively active emulsifiers, such as monoglycerides, percentages may be as low as 1.3% by weight of shortening, or even less, depending upon formulation. Operability of the invention does not place an upper bound on emulsifier levels, but use of emulsifiers at levels in excess of 6 to 10% may, in some cases, be limited by organoleptic or regulatory considerations. In any event, selection of the emulsifier level is not critical, so long as sufficient emulsifier is present to form a shortening-continuous dough system. These levels, in general, will be rather higher than those normally encountered in baked-good formulation, in part because it was not heretofore appreciated that any benefits could be achieved by the use of higher emulsifier levels.

In each case, determination of emulsifier levels should be based on the quantity of active emulsifier present in the total dough system. Thus, where commercial oils or shortenings are used which contain low levels of suitable emulsifiers, those emulsifiers should be taken into account in formulating the compositions of this invention. In other cases, emulsifier "stocks" or "concentrates" will be used. In these cases, too, it is also important to gauge emulsifier levels by quantity and activity of the active emulsifier species, not the total quantity of stock or concentrate used. For example, a particularly preferred emulsifier concentrate for use in the practice of this invention is a "superglycerinated" soybean oil which contains mono-, di-, and tri-glycerides in an approximate ratio of 1:1:1, and an Iodine Value of about 70. In this material, the most active emulsifier species is the monoglyceride, which accounts for approximately ⅓ of the concentrate. Thus, to achieve a level of 1.3% monoglycerides by weight of shortening, 4% of the superglycerinated soybean oil concentrate must be used to achieve the desired emulsifier level. Among the more effective emulsifiers, such as monoglycerides, levels will be typically at least about 1.3%, preferably 1.5%, and most preferably 2% emulsifier, by weight of total shortening.

As described above, the desired activity of the emulsifiers herein is the formation of a shortening-continuous dough. In general, the emulsifiers should be selected which exhibit this activity in the temperature range at which the dough will be mixed, i.e., the temperature at which the shortening, with water and emulsifier will be combined to form the water-in-oil emulsion. While mixing temperatures will typically be in the range of from about 15° C. to about 35° C., other emulsifiers, having higher or lower temperature-activity ranges, can be selected to suit the dough mixing conditions in any particular application of this invention. Thus, for mixing temperatures substantially above ambient, e.g., greater than about 60° C., a superglycerinated rapeseed stock, having a high proportion of mono-$C_{22}$-glyceride, can be used. Once the emulsion is formed, it will remain stable as the temperature is lowered, even though the emulsifier is incapable of forming such a system at the lower temperatures. Similarly, for low temperature processing conditions, a low-temperature-active emulsifier such as monolaurin can be selected. For maximum flexibility in dough mixing temperatures, a combination of high- and low-temperature-active emulsifiers can be used, as is often the practice in the bakery arts.

It has been found that the water in fresh or frozen (i.e., unreconstituted) egg white is too tightly bound to the egg protein to associate with an emulsifier to form a stable shortening-continuous system. Accordingly, where the term "water" is used herein, it should be understood to exclude the water in fresh or frozen egg white. If dry egg solids are used, addition of some water will be necessary in any event to form a coherent dough mass. If fresh of frozen egg is used, additional water will be necessary to form the requisite hydrated mesophase/emulsion in conjunction with the emulsifier and shortening. In all cases, the necessary free water can easily be supplied in pure form, in fluid milk, or in a simple solution of dough formula solubles (e.g., sugar syrup).

It has also been found that preformed oil-in-water emulsions do not exhibit appropriate phase behavior and are too stable to invert to the water-in-oil emulsions required in the products of this invention. Therefore, their use in the practice of this invention should be avoided.

INDUSTRIAL APPLICABILITY

Within the limits of operability, ingredients in any common low-water, baked-good formulation can be used in the practice of this invention. In general, sugar, flour, water and shortening, when combined in most reasonable proportions, will produce a dough suitable for the practice of this invention. Of course, the sweetness, texture, and similar organoleptic properties of the baked product will depend upon the ratio of sugar/flour/water/shortening. In general, any formulation which produces an organoleptically acceptable crumb-continuous product can be employed in the practice of the present invention. Preferred formulations, such as cookie formulations, will incorporate additional ingredients. For example, oatmeal cookies generally contain rolled oats to provide their characteristic flavor and texture. Peanut butter cookies will, of course, contain peanut butter, which provides not only the distinctive flavor of peanut butter, but also fluid oils (shortening) and peanut solids which supply both carbohydrates and proteins, similar to flour. Within limits, well known to the art, materials which "interrupt" the homogeneous composition of the baked product can be introduced into the formulation. These materials are essentially inert, so far as the chemistry of the dough is concerned. Examples of such materials are chopped nuts, coconut, oatmeal, raisins, and the like. Even in simple baked products, it may be desirable to incorporate additional flavoring materials, such as spices.

It can be appreciated that the benefits of this invention can also be made available to the homemaker, in the form of a culinary mix for a baked-good dough, comprising: (a) sugar; (b) flour; (c) shortening; and (d) sufficient emulsifier active at dough mixing temperatures to render the dough shortening-continuous.

Many culinary mixes are designed to accommodate addition of fresh egg by the consumer. It should be borne in mind that such mixes should be formulated to further require addition of free water, as indicated above. Alternatively, addition of fresh egg can be fully or partially eliminated by incorporation of dried egg solids or suitable egg substitutes into the mix. The culinary mix can be packaged as separate containers of dry and liquid ingredients, the liquid ingredients including, for example, shortening, emulsifier, and compatible flavorings and, optionally, water. In the latter instance, the liquid ingredients could be combined in a preformed water-in-oil emulsion, if desired.

The following examples illustrate the practice of this invention, while not intending to be limitative thereof.

EXAMPLES I-XIV

Chocolate chip cookie doughs were prepared according to the following general formula:

| Ingredient | Wt. %, Flour basis |
|---|---|
| Shortening + emulsifier | 80.6 |
| Brown sugar | 60.5 |
| Granulated sugar | 60.5 |
| Fresh egg yolk | 14.5 |
| Egg white[1] | 24.2 |
| Flour, all purpose | 100.0 |
| Baking soda | 1.6 |
| Salt | 1.6 |
| Dry vanilla flavor | 0.41 |
| Semisweet chocolate chips | 68.6 |

[1]Either fresh egg white or 2.4% dried egg white solids + 21.8% distilled water.

The doughs were prepared by (1) creaming together the sugar, shortening, and emulsifier, when used; (2) mixing in the egg ingredients; (3) blending in the flour, soda, salt and vanilla; and (4) blending the chips in gently by hand.

Within the foregoing formula, and using the foregoing procedure, doughs were made containing various emulsifiers, base shortenings, and forms of egg white.

After preparation, doughs were evaluated by small panels of experts for stickiness/tackiness, based on the degree of adherence to the mixing equipment and fingers. A simple three point grading system was used: (1) very sticky; (2) moderately sticky; (3) non-sticky. The formulations and results are indicated in the following table:

| Example | I | II | III | IV | V | VI |
|---|---|---|---|---|---|---|
| Shortening type[2] | oil | oil | oil | oil | oil | oil |
| Emulsifier | none | MG[4] | MG | MG | MG | SMO[5] |
| Emulsifier level[3] | 0 | 3% | 4% | 6% | 6% | 6% |
| Egg white form | dried | dried | dried | dried | fresh | dried |
| Stickiness | 1 | 1 | 2 | 3 | 1 | 3 |

| Example | VII | VIII | IX | X |
|---|---|---|---|---|
| Shortening type[2] | oil | oil | plastic fat | plastic fat |
| Emulsifier | POE[6] SMO | MO[7] | MG | MG |
| Emulsifier level[3] | 6% | 6% | 4.5% | 7.5% |
| Egg white form | dried | dried | dried | dried |
| Stickiness | 1 | 3 | 1 | 3 |

| Example | XI | XII | XIII | XIV |
|---|---|---|---|---|
| Shortening type[2] | oil | plastic fat | fluid shortening | oil |
| Emulsifier | lecithin[8] | MG/lecithin | MG | PGE[9] |
| Emulsifier level[3] | 3.3% | 4.5/1.0 | 5.6% | 6% |
| Egg white form | dried | dried | dried | dried |

| | | | | |
|---|---|---|---|---|
| Stickiness | 3 | 3 | 3 | 3 |

(2)Oil is liquid refined and lightly hydrogenated soybean oil (Crisco Oil TM); plastic fat is hydrogenated soybean oil plastic fat (Crisco TM); fluid shortening is a 75:25 blend of Crisco Oil TM :Crisco TM
(3)% Emulsifier stock by weight of shortening; uncompensated for % activity of emulsifier stock
(4)MG is superglycerinated soybean oil, Iodine Value about 70, 1:1:1 mono-:di-:triglycerides
(5)SMO = sorbitan monooleate (Span 80 - ICI Americas Co., HLB = 4.3)
(6)POE SMO polyoxyethylene sorbitan monooleate (TWEEN 80 ICI Americas Co., HLB = 15.0)
(7)MO = monoolein, laboratory grade
(8)Stated 60% active (Yelkins DS, Ross & Rowe, Inc.)
(9)PGE is laboratory-prepared polyglycerol ester, moderately hydrophilic, prepared as disclosed in U.S. Pat. No. 3,968,169, issued July 6, 1976, to Seiden et al., the disclosures of which are fully incorporated herein by reference. Forty-five percent of the product has from 2 to 4 glycerol units; 46% of the product is mono- or di-ester of a 45:55 mixture of palmitic and stearic acids.

Examples I–IV, IX and X show the effects of various emulsifier levels; Example V illustrates that the water in fresh egg white is unsuitable; and Example VII shows the unsuitability of an emulsifier with a HLB substantially greater than 8.

EXAMPLE XV

The following oatmeal cookie formula further illustrates the compositions of this invention.

| | Wt. %, Flour basis |
|---|---|
| Shortening + emulsifier: | |
| liquid lightly hydrogenated soybean oil | 86% |
| hydrogenated soybean oil plastic fat | 8% |
| superglycerinated soybean oil, iodine value about 70 | 3% |
| monolaurin | 3% |
| | 131.8 |
| Granulated Cane Sugar | 86.8 |
| Granulated Brown Sugar | 130.2 |
| Rolled Oats | 173.7 |
| Flour | 100.0 |
| Baking Soda | 2.2 |
| Salt | 1.5 |
| Spices and Flavors | 1.9 |
| Cellulose Gum | 0.8 |
| Dried Whole Egg | 14.8 |
| Water | 62.0 |

EXAMPLE XVI

The following sugar cookie formula also illustrates the compositions of this invention.

| Ingredient | Wt. %, flour basis |
|---|---|
| Shortening + emulsifier: | |
| Cottonseed oil 96% | |
| Monoolein 4% | |
| | 80.6 |
| Granulated cane sugar | 121.0 |
| Dried whole egg | 9.6 |
| Water | 29.0 |
| All purpose flour | 100.0 |
| Baking soda | 1.6 |
| Salt | 1.6 |
| Vanilla extract | 3.2 |

EXAMPLE XVII

In the formulation of Example XVI, lard can be substituted for cottonseed oil.

EXAMPLE XVIII

A culinary mix can be prepared from the formulation of Example XIII by substituting dry egg yolk for the fresh egg yolk. The shortening, emulsifier, and vanilla flavor are sealed in a plastic "flavor pouch" to keep them separate from the dry ingredients. Package instructions include addition of an appropriate amount of cold water (21.8%, flour basis) dependent on the weight of packaged mix.

EXAMPLE XIX

An "add oil" culinary mix can be prepared from the formulation of Example XVIII by deleting the oil portion of the shortening and instructing the consumer to add an equal amount of oil.

EXAMPLE XX

By deletion of the water ingredient, a culinary mix can be prepared from the oatmeal cookie formula of Example XV. Shortening and emulsifier are packaged in plastic, as in Example XVIII.

EXAMPLE XXI

In the culinary mix of Example XX, the water in the formula of Example XV can be placed in the shortening-emulsifier packet. The mix is prepared simply by mixing the dry ingredients with the contents of the packet, forming the cookies, and baking.

What is claimed is:

1. A nonadherent cookie dough composition, comprising: (a) sugar; (b) flour; (c) shortening; (d) 15–60%, by weight of the shortening, of water; and (e) sufficient emulsifier active at dough mixing temperatures to render the dough system shortening-continuous.

2. A dough according to claim 1 wherein the shortening is a triglyceride fat.

3. A dough according to claim 2 wherein the shortening comprises refined, lightly hydrogenated soybean oil.

4. A dough according to claim 2 wherein the shortening comprises a plastic fat.

5. A dough according to claim 1 wherein the emulsifier is active at a temperature in the range of from about 15° to about 35° C.

6. A dough according to claim 5 wherein the emulsifier has a hydrophilic-lipophilic balance of at most about 8.

7. A dough according to claim 6 wherein the emulsifier is a member selected from the group consisting of monoglycerides, lecithins, and polyglycerol esters and mixtures thereof.

8. A dough according to claim 7 wherein the monoglycerides are monoglycerides of $C_{12}$–$C_{22}$ fatty acids.

9. A dough according to claim 8 wherein the monoglyceride is monolaurin.

10. A dough according to claim 8 wherein the monoglyceride is monoolein.

11. A dough according to claim 7 wherein the lecithin is a soybean lecithin.

12. A dough according to claim 11 wherein the lecithin is a fractionated lecithin.

13. A dough according to claim 7 wherein the polyglycerol esters have an average of from 2 to 10 glycerol units and from 1 to 3 fatty acyl groups of from 14 to 18 carbon atoms per glycerol moiety.

14. A dough according to claim 13 wherein the polyglycerol esters have an average of 2 or 3 glycerol units and 1 fatty acyl group having from 14 to 18 carbon atoms per polyglycerol moiety.

15. A dough according to claim 14 wherein the polyglycerol ester is triglycerol monostearate.

16. A dough according to claim 14 wherein the polyglycerol ester is triglycerol monooleate.

17. A dough according to claim 1 wherein the emulsifier is in the form of a concentrate comprising a superglycerinated oil stock.

18. A dough according to claim 17 wherein the concentrate is a superglycerinated soybean oil comprising a mixture of mono-, di- and triglycerides in a ratio of about 1:1:1 and having an iodine value of about 70.

19. A dough according to claim 1 wherein the active emulsifier concentration is in the range of from about 1.3% to about 10% by weight of shortening.

20. A dough according to claim 19 wherein the active emulsifier concentration is in the range of from about 1.5% to about 6% by weight of shortening.

21. A dough according to claim 20 wherein the active emulsifier concentration is about 2% by weight of shortening.

22. A method for rendering non-adherent, a cookie dough comprising sugar, flour, shortening and 15–60%, by weight of the shortening, of water, comprising adding to the dough sufficient emulsifier to render the dough shortening-continuous at the dough mixing temperature.

23. A method according to claim 22 wherein the shortening is a triglyceride fat.

24. A method according to claim 23 wherein the shortening comprises refined, lightly hydrogenated soybean oil.

25. A method according to claim 23 wherein the shortening comprises a plastic fat.

26. A method according to claim 22 wherein the emulsifier is active at a temperature in the range of from about 15° to about 35° C.

27. A method according to claim 26 wherein the emulsifier has a hydrophilic-lipophilic balance of at most about 8.

28. A method according to claim 27 wherein the emulsifier is a member selected from the group consisting of monoglycerides, lecithins, and polyglycerol esters and mixtures thereof.

29. A method according to claim 28 wherein the monoglycerides are monoglycerides of $C_{12}$–$C_{22}$ fatty acids.

30. A method according to claim 29 wherein the monoglyceride is monolaurin.

31. A method according to claim 29 wherein the monoglyceride is monoolein.

32. A method according to claim 28 wherein the lecithin is a soybean lecithin.

33. A method according to claim 32 wherein the lecithin is a fractionated lecithin.

34. A method according to claim 28 wherein the polyglycerol esters have an average of from 2 to 10 glycerol units and from 1 to 3 fatty acyl groups of from 14 to 18 carbon atoms per glycerol moiety.

35. A method according to claim 34 wherein the polyglycerol esters have an average of 2 or 3 glycerol units and 1 fatty acyl group having from 14 to 18 carbon atoms per polyglycerol moiety.

36. A method according to claim 35 wherein the polyglycerol ester is triglycerol monostearate.

37. A method according to claim 35 wherein the polyglycerol ester is triglycerol monooleate.

38. A method according to claim 22 wherein the emulsifier is in the form of a concentrate comprising a superglycerinated oil stock.

39. A method according to claim 38 wherein the concentrate is a superglycerinated soybean oil comprising a mixture of mono-, di- and triglycerides in a ratio of about 1:1:1 and having an iodine value of about 70.

40. A method according to claim 22 wherein the active emulsifier concentration is in the range of from about 1.3% to about 10% by weight of shortening.

41. A method according to claim 40 wherein the active emulsifier concentration is in the range of from about 1.5% to about 6% by weight of shortening.

42. A method according to claim 41 wherein the active emulsifier concentration is about 2% by weight of shortening.

* * * * *